(12) United States Patent
Traeger (10) Patent No.: US 10,711,995 B2
(45) Date of Patent: Jul. 14, 2020

(54) DUAL-FUEL GAS-PELLET BURNER ASSEMBLY

(71) Applicant: ORIGINAL PELLET GRILL COMPANY, LLC, Mount Angel, OR (US)

(72) Inventor: Joe Traeger, Mount Angel, OR (US)

(73) Assignee: Original Pellet Grill Company LLC, Mount Angel, OR (US)

( * ) Notice: Subject to any disclaimer, the term of this patent is extended or adjusted under 35 U.S.C. 154(b) by 998 days.

(21) Appl. No.: 15/217,995

(22) Filed: Jul. 23, 2016

(65) Prior Publication Data

US 2016/0327263 A1    Nov. 10, 2016

Related U.S. Application Data

(63) Continuation-in-part of application No. 14/120,191, filed on May 2, 2014, now abandoned.

(60) Provisional application No. 61/818,841, filed on May 2, 2013.

(51) Int. Cl.
*F23C 1/04*    (2006.01)
*A47J 37/07*   (2006.01)
*F24C 1/04*    (2006.01)

(52) U.S. Cl.
CPC .............. *F23C 1/04* (2013.01); *A47J 37/0704* (2013.01); *A47J 37/0713* (2013.01); *A47J 37/0786* (2013.01); *F24C 1/04* (2013.01)

(58) Field of Classification Search
CPC . F23C 1/04; F24C 1/04; A47J 37/0713; A47J 37/0786; A47J 37/0704

USPC .............................. 126/25 R, 10, 36; 99/447
See application file for complete search history.

(56) References Cited

U.S. PATENT DOCUMENTS

| | | |
|---|---|---|
| 652,531 A | 6/1900 | Carlson |
| 1,779,453 A | 10/1930 | Taylor |
| 2,444,985 A | 7/1948 | Fulton |
| 3,079,909 A | 3/1963 | Bemben |

(Continued)

FOREIGN PATENT DOCUMENTS

| | | |
|---|---|---|
| DE | 202006016487 U1 | 2/2008 |
| GB | 821175 A | 9/1959 |

(Continued)

*Primary Examiner* — Grant Moubry
*Assistant Examiner* — Rabeeul I Zuberi
(74) *Attorney, Agent, or Firm* — Renaisance IP Law Group, LLP; David A. Crowther (57) ABSTRACT

Embodiments of the inventive concept provide a dual-fuel gas-pellet burner assembly. The dual-fuel gas-pellet burner assembly can include a cooking gas line, a cooking gas igniter, a motor-driven pellet auger, a combustion air channeling section enclosing the motor-driven pellet auger and at least a section of the cooking gas line, and a dual-fuel sectioned combustion chamber including a gas combustion section and a fire pot section. The gas combustion section includes a terminal end of the cooking gas line and the cooking gas igniter disposed therein. The fire pot section includes a terminal end of the motor-driven pellet auger disposed therein. The gas combustion section of the dual-fuel sectioned combustion chamber is partitioned off from the fire pot section by an internal separator wall. A control unit including a digital temperature display, a temperature dial, and a switch can receive a user selection among three different modes of operation.

19 Claims, 9 Drawing Sheets

(56) References Cited

U.S. PATENT DOCUMENTS

| | | | |
|---|---|---|---|
| 3,220,400 A | 11/1965 | Yager | |
| 3,279,452 A | 10/1966 | Hottenroth et al. | |
| 3,339,540 A | 9/1967 | Kreider | |
| 3,359,968 A | 12/1967 | Thulman | |
| 3,474,725 A | 10/1969 | McClaren | |
| 3,515,117 A | 6/1970 | Gene | |
| 3,683,791 A | 8/1972 | Rast, Jr. | |
| 3,809,056 A | 5/1974 | Snelling | |
| 3,809,058 A | 5/1974 | Becker | |
| 3,882,767 A | 5/1975 | Margaret et al. | |
| 3,982,522 A | 9/1976 | Hottenroth et al. | |
| 4,362,093 A | 12/1982 | Griscom | |
| 4,471,751 A | 9/1984 | Hottenroth et al. | |
| 4,495,860 A | 1/1985 | Hitch et al. | |
| 4,572,062 A | 2/1986 | Widdowson | |
| 4,700,618 A | 10/1987 | Cox | |
| 4,721,037 A | 1/1988 | Blosnich | |
| 4,823,684 A | 4/1989 | Traeger et al. | |
| 5,163,358 A * | 11/1992 | Hanagan | A47J 37/0713 126/25 R |
| 5,421,321 A | 6/1995 | Ward | |
| 5,429,110 A * | 7/1995 | Burke | A47J 37/0704 110/110 |
| 6,223,737 B1 * | 5/2001 | Buckner | F23B 1/38 110/108 |
| 6,769,907 B2 | 8/2004 | Doud | |
| 8,028,690 B1 | 10/2011 | Lohaus | |
| 8,535,052 B2 | 9/2013 | Cadima | |
| 8,776,777 B2 | 7/2014 | Jin et al. | |
| 8,899,222 B2 | 12/2014 | DeFoort et al. | |
| 8,936,017 B2 | 1/2015 | Baggott | |
| 9,814,354 B2 | 11/2017 | McAdams et al. | |
| 2003/0194671 A1 | 10/2003 | Webb | |
| 2007/0224560 A1 | 9/2007 | Stainrod et al. | |
| 2008/0163863 A1 | 7/2008 | Thomas | |
| 2011/0315092 A1 * | 12/2011 | Grant | F23C 1/02 122/22 |
| 2012/0006316 A1 | 1/2012 | Shimek et al. | |
| 2013/0288189 A1 | 10/2013 | White | |
| 2014/0238378 A1 | 8/2014 | Scott | |
| 2016/0255999 A1 * | 9/2016 | McAdams | A47J 37/0763 |
| 2017/0164783 A1 * | 6/2017 | Sauerwein | A47J 37/0709 |
| 2019/0125129 A1 * | 5/2019 | Bittel | A47J 37/0713 |
| 2019/0133374 A1 * | 5/2019 | McAdams | F23B 20/00 |

FOREIGN PATENT DOCUMENTS

| | | | |
|---|---|---|---|
| GB | 2480449 A | 11/2011 | |
| KR | 101313429 | 10/2013 | |
| KR | 101313436 | 10/2013 | |
| WO | WO 2008/068587 A2 * | 6/2008 | F23C 1/02 |

* cited by examiner

DUAL-FUEL GAS-PELLET BURNER ASSEMBLY

RELATED APPLICATION DATA

This application is a continuation-in-part of copending, commonly-owned U.S. patent application Ser. No. 14/120,191, filed May 2, 2014, which claims the benefit of U.S. provisional application No. 61/818,841, filed May 2, 2013, which are hereby incorporated by reference.

TECHNICAL FIELD

The present invention relates generally to wood pellet-burning barbecues, and, more particularly, to a dual-fuel gas-pellet burner for use with such barbecues.

BACKGROUND

Wood pellet-burning barbecues are popular for outdoor cooking, particularly at homes and in household situations. Conventional wood pellet-burning barbecues, of the type described in U.S. Pat. No. 4,823,684, employ a motor-driven auger to provide a measured feed of wood pellets into a combustion region where the pellets are burned to provide heat and smoke to cook food.

An aspect of such conventional wood pellet-burning barbecues is that the heat generated for larger cooking areas can be limited. While some household barbecues can be large enough to pose such a problem, the issue can become significant in the context of the requirements of commercial cooking. Commercial cooking can require very large cooking areas to serve a larger clientele, and can also require higher cooking heat to achieve desired cooking results. Moreover, igniter systems in conventional wood pellet-burning barbecues degrade quickly due to their interaction with the wood pellets. As a result, there is a need to provide improved heat generation in some pellet burning barbecues.

The foregoing and other features of the inventive concept will become more readily apparent from the following detailed description, which proceeds with reference to the accompanying drawings.

DETAILED DESCRIPTION OF THE EMBODIMENTS

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first burner could be termed a second burner, and, similarly, a second burner could be termed a first burner, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
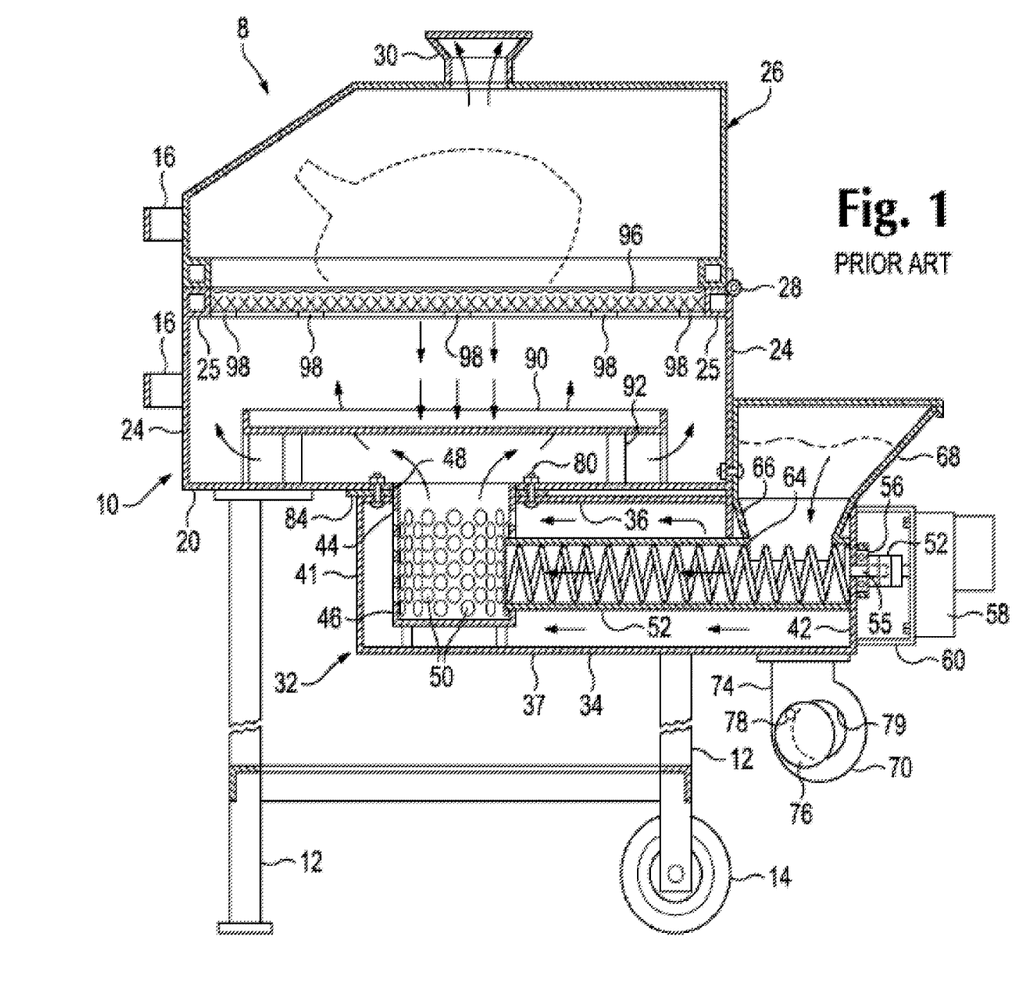
FIG. 1 is a side elevation, with portions broken away, of a prior art wood pellet burning barbecue.

FIG. 1 is a side elevation, with portions broken away, of a prior art pellet-burning barbecue 8 described in U.S. Pat. No. 4,823,684. Barbecue 8 is configured to place the top of a pan 10 at a convenient working height above the ground, through legs 12 secured to and extending downwardly from the base of the pan 10. For convenience of moving, if desired, wheels 14 are provided rotatably journaled on the base of two of the legs in the barbecue. For moving purposes, the barbecue may be partially raised utilizing handles 16 connected to the pan whereby ground contact is solely through those legs having wheels 14, the barbecue then being rollable to the position desired.

Figure 2:
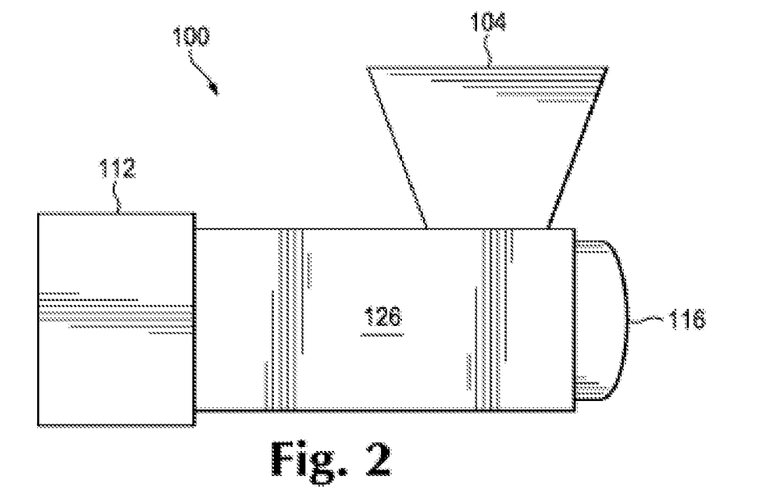
FIG. 2 is a side view of one implementation of a dual-fuel gas-pellet burner according to some embodiments of the present invention.

Pan 10 includes a bottom 20 and opposed side and end walls 22, 24 joined to bottom 20. The top of the pan may be reinforced as by framing 25. Pan 10 is open at the top. If desired, a hinged cover 26 may be included connected by hinges 28 to pan 10. The cover is swingable between a closed position where the cover closes off the top of the barbecue pan, as shown in FIG. 2, and an open position where the cover is swung to one side to expose the barbecue pan interior, as shown in FIG. 1. The cover may further include a ventilating hood as shown at 30.

A burner assembly 32 extends underneath the barbecue pan from approximately centrally of the pan to a position on one side thereof. In the specific embodiment of the invention disclosed, the burner assembly 33 includes an elongate housing 34 of substantially rectangular, i.e., square, cross section, and including top, bottom, and opposed side walls indicated at 36, 37, 38, and 39. The ends of the housing are closed off by end walls 41, 42.

Top wall 36 has a circular aperture 44 adjacent one end. Suitably secured as by welding within the housing and communicating with this aperture is a cylindrical fire pot 46 which is open at its top and closed at its bottom. The interior of the fire pot faces upwardly, and communicates with the interior of pan 10 through aperture 48 in bottom 20 of the pan. The cylindrical wall of the fire pot contains perforations 50.

With the construction described, the housing walls define a chamber extending along the interior of the housing and this chamber communicates through perforations 50 with the interior of the fire pot. Extending along the interior of housing 34 is a tube 52 having one end secured as by welding to the cylindrical wall of pot 46. The wall of the pot is cut out to provide an opening therein which communicates with the interior of tube 52. The opposite end of the tube is appropriately secured to end wall 42 of the housing.

Mounted within tube 52 is an elongate auger 54 terminating in a shaft 55. The shaft extends through wall 42 where it is supported in a bearing assembly 56. An electric gear motor 58 mounted on the end of the housing through bracket 60 has its output shaft connected through drive coupling 62 with the end of auger shaft 55.

Tube 52 is open at 64 and a wall 66 extending up from this opening provides a throat for the channeling of pellet fuel downwardly onto the auger to be fed thence by operation of the auger through the auger tube. A hopper 68 is supported on top of housing 34 which holds a supply of pellet fuel. The top wall of the housing is suitably cut away to place the base of the hopper in direct communication with the top of the throat defined by wall 66.

Supported on the underside of housing 34 approximately underneath the hopper is an electrically operated blower 70 having its discharge end connected through duct 74 with the chamber defined along the length of the interior of housing 34. A shutter 76 supported on the blower assembly by a pivot mounting 78 is adjustable to vary the degree of closure of intake 79 to the blower and, in this way, the amount of airflow produced by the blower through its discharge opening along the length of the housing.

The housing is supported on the underside of the pan through bolts 80 which extend upwardly from top wall 36 and through accommodating bores provided in the bottom of the pan, with securement completed using nuts screwed onto the protruding ends of the bolts. Gasket material 84 may be provided intermediate the top wall of the housing and the underside of the barbecue pan. Additional securement of the housing beneath the barbecue pan may be provided by securing a portion of the hopper to the side of the pan in an appropriate manner Disposed within the interior of the barbecue pan somewhat upwardly from the top of the fire pot is a nonperforate, metallic, baffle pan or plate shown at 90 including a floor and a raised shoulder extending about its perimeter. The baffle plate extends in a region disposed over the top of the fire pot and outwardly from this region to edges disposed inwardly somewhat from the side walls of the barbecue pan. The baffle plate is removably supported in this position as by legs 92 which may be joined either to the underside of the baffle pan or to the base of the barbecue pan with their opposite extremities unsecured. A food-support means or grill 96 is mounted within the interior of the barbecue pan and directly adjacent the top thereof, such grill being supported on support lugs 98 joined to the side walls of the barbecue pan.

To start up the barbecue, the grill is removed and the baffle pan tipped to an upright position which exposes the top of the fire pot. A small amount of wood pellets, i.e., a handful, are then placed in the fire pot together with combustible material such as paper, and the like. This is then lit, and combustion allowed to proceed for a short period of time such as two minutes or so. The baffle pan and grill may then be replaced in their operative positions, the air blower started, and the auger motor started. This produces forced-air circulation down the interior of housing 34 with the air blowing inwardly into the fire pot to support combustion of the material therein. The operation of the auger produces a gradual feed of replacement pellets to the fire pot, replacing material as such is burned. Normally a warmup period of only a few minutes is required after replacement of the grill and before cooking may proceed.

With the barbecue operating, food to be cooked may be placed on the grill. The blower produces forced-air circulation within the interior of the barbecue pan with heated air coming from the fire pot moving upwardly and around the baffle plate and thence circulating against and through the grill. Cooking may be performed with the cover in the closed position or with the cover open. With the cover closed, oven-like conditions are produced within the barbecue, and with the cover open, grill-like conditions are produced. The baffle plate on being heated radiates heat upwardly. Drippings from any food cooked are prevented from falling into the fire pot by the baffle plate which collects such material. With cooking concluded, the auger is stopped which stops feed of pellet material to the fire pot. With stoppage of pellet feed and with the blower turned off, combustion in the pot soon terminates.

Figure 3:
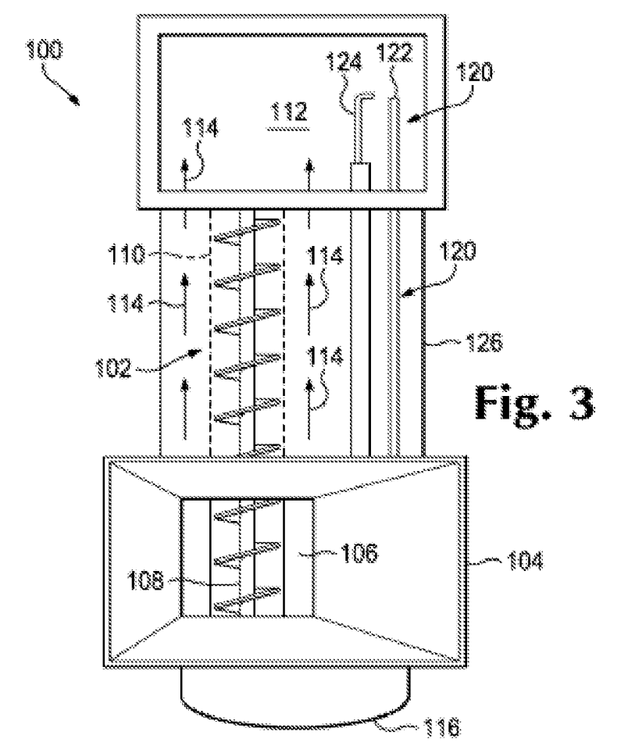
FIG. 3 is a plan view, with portions broken away, of the dual-fuel gas-pellet burner of FIG. 2.

FIGS. 2 and 3 illustrate a dual-fuel gas-pellet burner assembly 100 operable, for example, as a substitute for or alternative to burner assembly 32 described with reference to prior art pellet-burning barbecue 8 of FIG.1.

Gas-pellet burner assembly 100 includes a pellet burner sub-assembly 102, generally analogous to pellet burner assembly 32 shown in FIG. 1, and a hopper 104 that receives and stores a supply of fuel (e.g., wood) pellets and feeds them through a pellet intake 106 to an auger 108 in a pellet shaft 110. Auger 108, being driven by an electrical motor (not shown), functions to feed the pellets along pellet shaft 110 and into a combustion chamber 112, which includes one or more perforations (not shown) to receive airflow 114 from a fan 116 to facilitate burning of the pellets. In addition to providing efficient combustion, the airflow 114 can also distribute heat resulting from the combustion in combustion chamber 112 throughout a barbecue to improve the cooking of food.

Gas-pellet burner assembly 100 further includes a gas burner sub-assembly 120 that includes a gas line or tube 122 that receives a supply of cooking gas (e.g., propane, natural gas, etc., referred to generally as "gas") to deliver the gas to combustion chamber 112. A gas igniter 124 is positioned in combustion chamber 112 to ignite gas delivered thereto. Pellet burner sub-assembly 102 and gas burner sub-assembly 120 are contained within a housing 126. Gas burner sub-assembly 120 provides two functions in the operation of gas-pellet burner assembly 100. In one mode of operation, gas burner sub-assembly 120 functions as the initial pellet combustion igniter to begin combustion of the pellets of pellet burner sub-assembly 102. In this mode of operation, gas-pellet burner assembly 100 may be operated temporarily until pellets in combustion chamber 112 are ignited. In another mode of operation, gas burner sub-assembly 120 functions as a burner for cooking food operable independently of pellet burner sub-assembly 102. In this mode of operation, gas burner sub-assembly 120 may be operated alone or with concurrent operation of pellet burner sub-assembly 102. Likewise, after initial ignition, pellet burner sub-assembly 102 may be operated alone or with concurrent operation of gas burner sub-assembly 120. Combustion in combustion chamber 112, of either pellets or gas or both together, operates to cook food in a barbecue.

It will be appreciated, however, that differences between the combustion of pellets and gas allows dual-fuel gas-pellet burner assembly 100 to provide a wider range of operation than does conventional pellet burner assembly 32 (FIG. 1). The high energy content of cooking gas relative to wood fuel pellets can provide a significant increase in the heat that can be generated by gas-pellet burner assembly 100 relative to the heat that can be generated by conventional pellet burner assembly 32. The increased heat generation, whether gas is used alone or in combination with pellet fuel, allows gas-pellet burner assembly 100 to provide the heat necessary to operated larger barbecues at higher temperatures as may be required, for example, in commercial cooking applications.

Figure 4:
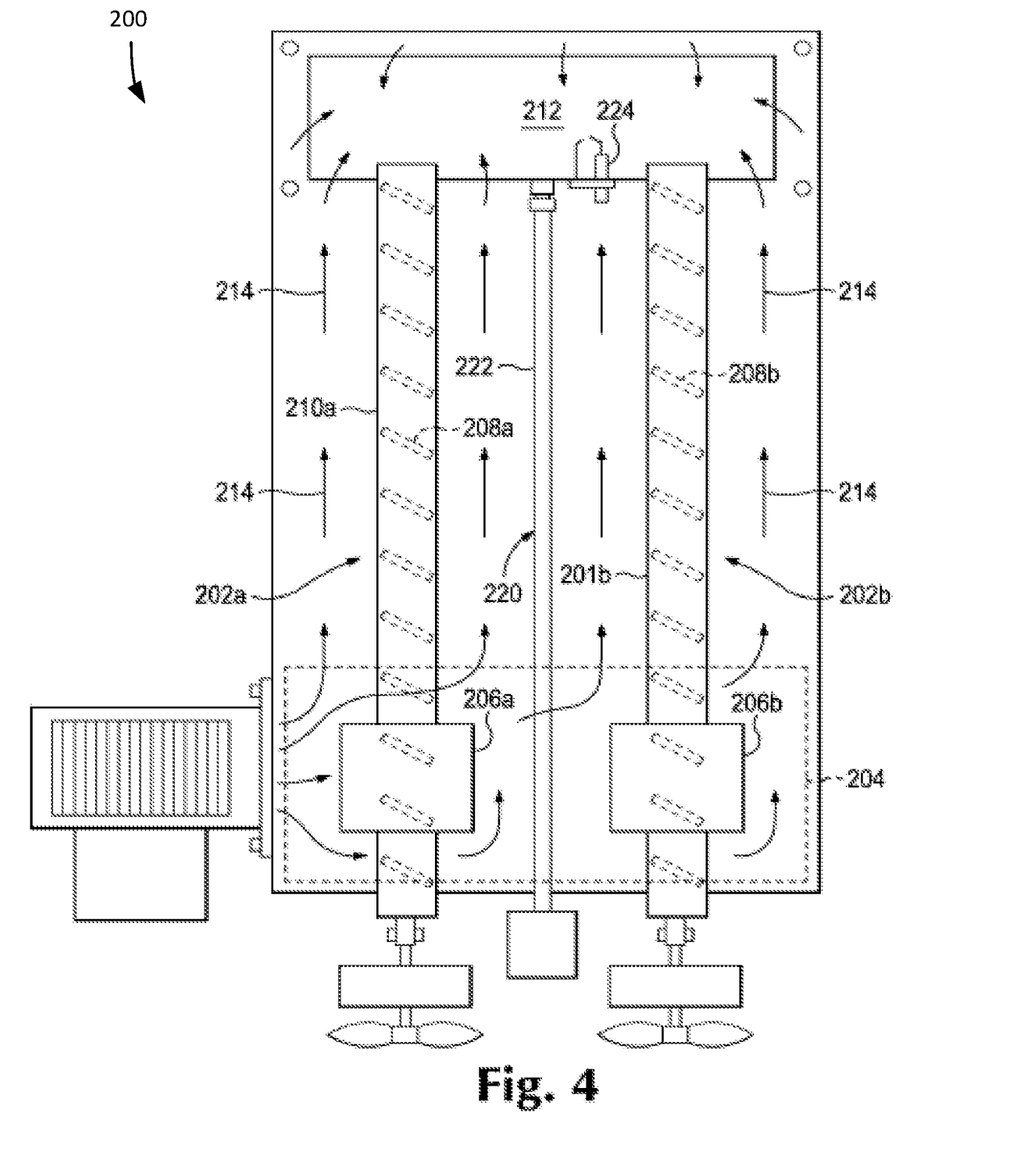
FIG. 4 is schematic plan view of another implementation of a dual-fuel gas-pellet burner according to some embodiments of the present invention.

FIG. 4 is schematic plan view a dual-fuel gas-pellet burner assembly 200 operable also as a substitute for or alternative to burner assembly 32 of barbecue 8 (FIG. 1), for example, as another implementation of a dual-fuel gas-pellet burner according to the present invention. Gas-pellet burner assembly 200 includes first and second pellet burner sub-assemblies 202a and 202b, generally analogous to pellet burner sub-assembly 102 (FIG. 3). Pellet burner sub-assemblies 202a and 202b may include a shared hopper or separate hoppers (shown in outline as a shared hopper 204) that receives and stores a supply of fuel (e.g., wood) pellets and feeds them through pellet intakes 206a and 206b to augers 208a and 208b in pellet shafts 210a and 201b, respectively.

Figure 5:
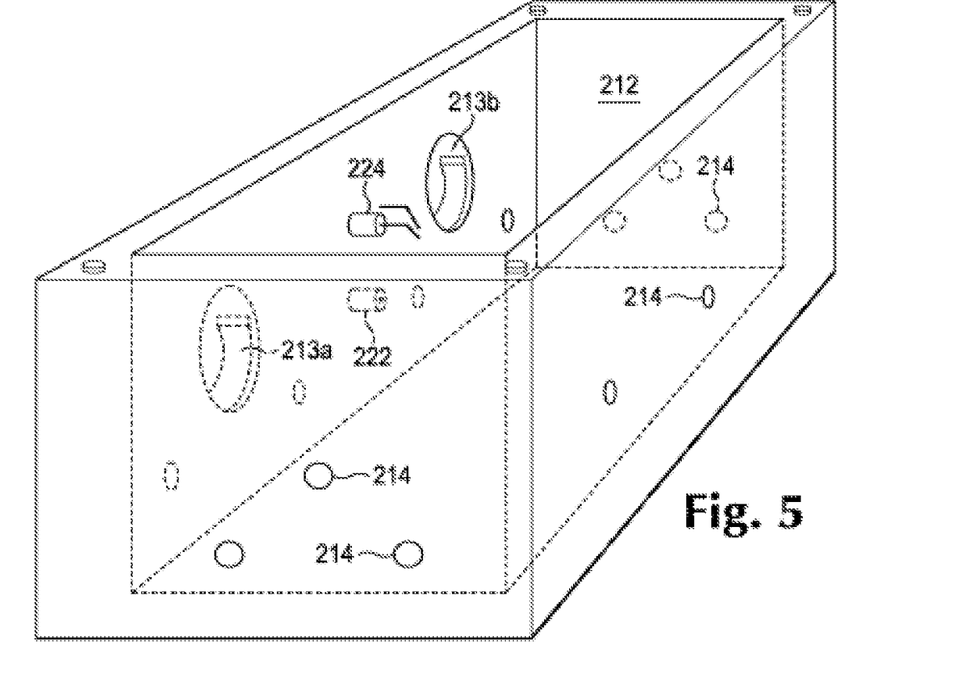
FIG. 5 is an isometric elevation illustration of a combustion chamber that may be used in the dual-fuel gas-pellet burner of FIG. 4.

Referring also to FIGS. 4 and 5, augers 208a and 208b are driven by electrical motors 211a and 211b and function to feed the pellets along respective pellet shafts 210a and 201b, through pellet shaft inlets 213a and 213b into a combustion chamber 212. Combustion chamber 212 may include multiple perforations 214 to improve airflow into and through combustion chamber 212 to facilitate burning of the pellets.

Gas-pellet burner assembly 200 further includes a gas burner sub-assembly 220 that includes a gas line or tube 222 that receives a supply of cooking gas (e.g., propane, natural gas, etc., referred to generally as "gas") to deliver the gas to combustion chamber 212. A gas igniter 224 is positioned in combustion chamber 212 to ignite gas delivered thereto and operates in substantially the manner described above with reference to igniter 124. With the high energy content of cooking gas relative to wood fuel pellets, first and second pellet burner sub-assemblies 202a and 202b of gas-pellet burner assembly 200 allow for a greater relative flow of pellets than in gas-pellet burner assembly 100, thereby enriching the relative proportion of cooking from pellets to gas.

Figure 6:
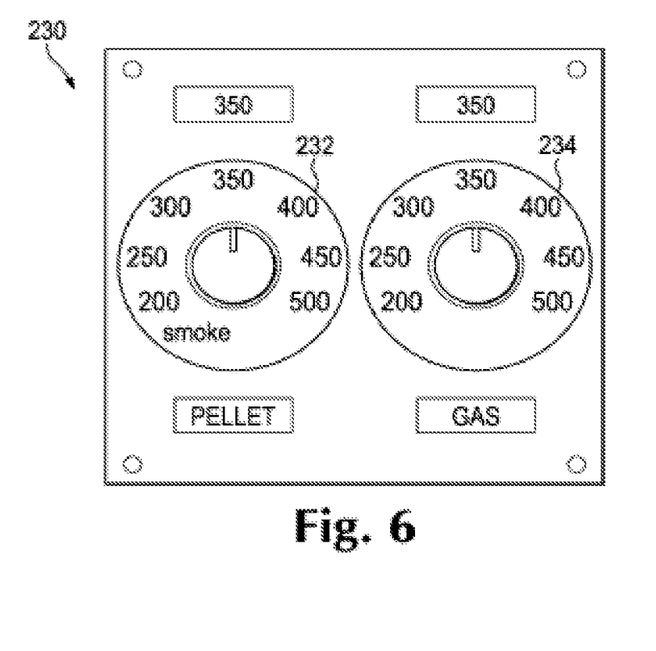
FIG. 6 is an illustration of a controller that includes pellet burner control and a separate gas burner control for a dual-fuel gas-pellet burner.

FIG. 6 is an illustration of a controller 230 that includes pellet burner control 232 and a separate gas burner control 234 for either of dual-fuel gas-pellet burners 100 and 200. As indicated, the controller 230 allows for independent use and control of both the pellet burner sub-assembly and the gas burner sub-assembly of a dual-fuel gas-pellet burner.

Figure 7:
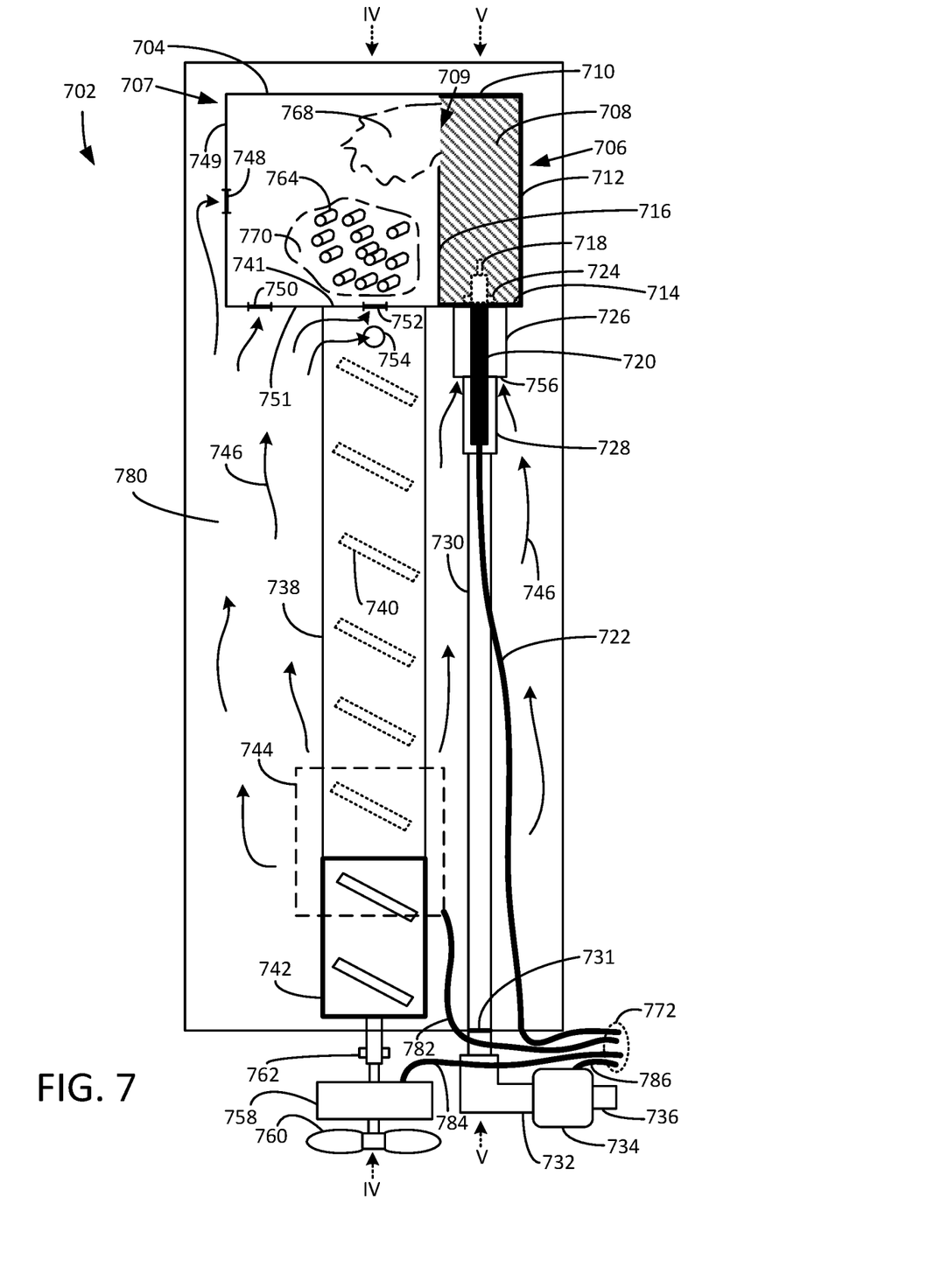
FIG. 7 is an open plan view of another implementation of a dual-fuel gas-pellet burner assembly according to some embodiments of the present invention.

FIG. 7 is an open plan view of another implementation of a dual-fuel gas-pellet burner assembly 702 according to some embodiments of the present invention. In some embodiments, the dual-fuel gas-pellet burner assembly 702 is a barbecue gas-pellet burner assembly. The dual-fuel gas-pellet burner assembly 702 can include an auger housing 738 containing a motor-driven pellet auger 740. The dual-fuel gas-pellet burner assembly 702 can further include a cooking gas line 730 and a cooking gas igniter 718, as further described below. A combustion air channeling section 780 can substantially enclose the auger housing 738, the motor-driven pellet auger 740, and at least a section of the cooking gas line 730.

The dual-fuel gas-pellet burner assembly 702 can include a dual-fuel sectioned combustion chamber 704 having a gas combustion section 706 and a fire pot section 707. The gas combustion section 706 can include a terminal end 724 of the cooking gas line 730 and the cooking gas igniter 718 disposed therein. The fire pot section 707 can include a terminal end 741 of the motor-driven pellet auger 740 disposed therein. The gas combustion section 706 can be substantially enclosed by walls, such as walls 708, 710, 712, 714, and 716. At least some of the walls of the gas combustion section 706 can be shared walls with the dual-fuel sectioned combustion chamber 704.

The gas combustion section 706 of the dual-fuel sectioned combustion chamber 704 can be partitioned off from the fire pot section 707 by an internal separator wall 716. An opening 709 in the internal separator wall 716 connects the gas combustion section 706 of the dual-fuel sectioned combustion chamber 704 to the fire pot section 707 of the dual-fuel sectioned combustion chamber 704. The motor-driven pellet auger 740 can deliver wood fuel pellets 764 to the fire pot section 707 of the dual-fuel sectioned combustion chamber 704. The cooking gas igniter 718 disposed in the gas combustion section 706 of the dual-fuel sectioned combustion chamber 704 can be an electric igniter. The cooking gas igniter 718 can ignite cooking gas 768 received from the cooking gas line 730 within the gas combustion section 706 that is partitioned off from the fire pot section 707. The opening 709 in the internal separator wall 716 can permit the ignited cooking gas 768 to enter the fire pot section 707 of the dual-fuel sectioned combustion chamber 704 to combust the wood fuel pellets 764.

The fire pot section 707 of the dual-fuel sectioned combustion chamber 704 can include one or more combustion air ports (e.g., 748, 750, and 752) through which air 746 that is channeled by the air channeling section 780 enters the fire pot section 707. For example a combustion air port 748 can be disposed in a wall 749 that is opposite the gas combustion section 706. By way of another example, a combustion air port 750 can be disposed in a wall 751 that is adjacent to the auger housing 738. By way of yet another example, a combustion air port 752 can be disposed in the wall 751 that is adjacent to and above the auger housing 738.

The auger housing 738 can enclose the motor-driven pellet auger 740. The auger housing 738 can include an open end (i.e., terminal end 741) within the fire pot section 707 of the dual-fuel sectioned combustion chamber 704, through which the wood fuel pellets 764 can be pushed. The auger housing 738 can include one or more air ports (e.g., 754) through which air 746 that is channeled by the air channeling section 780 enters the auger housing 738 and into the fire pot section 707 of the dual-fuel sectioned combustion chamber 704.

The dual-fuel gas-pellet burner assembly 702 can include a cooking gas line holder 726 embedded in an external wall 714 of the dual-fuel sectioned combustion chamber 704. The cooking gas line holder 726 can hold the cooking gas line 730. An air inlet 756 can be disposed within the cooking gas line holder 726 through which air 746 that is channeled by the air channeling section 780 can enter the gas combustion section 706 of the dual-fuel sectioned combustion chamber 704. The air inlet 756 can be substantially annular in shape.

The dual-fuel gas-pellet burner assembly 702 can include a gas line port 731 and a gas solenoid 734. The cooking gas line 730 can include a gas pipe 730 and a gas orifice section 728. The cooking gas line holder 726 can receive and secure the gas orifice section 728. The gas pipe 730 can extend from the gas orifice section 728 along the combustion air channeling section 780 and through the gas line port 731. The gas pipe 730 can be coupled to the gas solenoid 734 by way of a corner pipe section 732. The cooking gas line 730 can extend beyond the gas solenoid 734 by way of pipe 736 to a cooking gas storage tank (not shown).

The dual-fuel gas-pellet burner assembly 702 can include a combustion air fan 744 coupled to a bottom wall of the combustion air channeling section 780. The combustion air fan 744 can force external air into the air channeling section 780, and into both of the gas combustion section 706 of the dual-fuel sectioned combustion chamber 704 by way of the air inlet 756, and into the fire pot section 707 of the dual-fuel sectioned combustion chamber 704 by way of the one or more combustion air ports (e.g., 748, 750, and 752).

The gas combustion section 706 of the dual-fuel sectioned combustion chamber 704 can receive and mix the air 746 with cooking gas in the gas combustion section 706 of the dual-fuel sectioned combustion chamber 704. The cooking gas igniter 718 can ignite the mixture of the air and the cooking gas in the gas combustion section 706 of the dual-fuel sectioned combustion chamber 704. The fire pot section 707 of the dual-fuel sectioned combustion chamber 704 can combine the ignited mixture 768 of the air and the cooking gas with wood fuel pellets 764. The ignited mixture 768 of the air and the cooking gas combusts the wood fuel pellets 764 in a gaseous combustion 770.

The dual-fuel gas-pellet burner assembly 702 can include a gas flame sensor 720 coupled to the cooking gas igniter 718. An igniter wire 722 can be coupled to the gas flame sensor 720. The igniter wire 722 can carry an electric pulse to the cooking gas igniter 718. An auger motor 758 can be coupled to the motor-driven pellet auger 740 via coupling mechanism 762. A control wire 784 can be coupled to the auger motor 758 to control the auger motor 758, such as by setting the auger motor 758 to an on mode, an off mode, and/or varying its speed. The combustion air fan 744 can be coupled to a control wire 782, which can control the combustion air fan 744 such as by setting the combustion air fan 744 to an on mode, an off mode, and/or varying its speed. The gas solenoid 734 can be coupled to the cooking gas line 730, and to a control wire 786. The control wire 786 can control a flow of cooking gas through the cooking gas line 730 by adjusting the flow rate through the gas solenoid 734. The igniter wire 722 and the control wires 782, 784, and 786 can be combined as bundled wires 772, which can be coupled to a control unit, as further described below. It will be understood that the bundled wires 772 can contain more than or fewer than the wires shown.

A fan 760 can be coupled to the auger motor 758 to cool the auger motor 758 during operation. An opening 742 in an upper end section of the auger housing 738 can receive wood fuel pellets (e.g., 764) on a low temperature end of the dual-fuel gas-pellet burner assembly 702. The motor-driven pellet auger 740 can then push the wood fuel pellets (e.g., 764) to a high temperature end of the dual-fuel gas-pellet burner assembly 702 for delivery into the fire pot section 707 of the dual-fuel sectioned combustion chamber 704.

Figure 8:
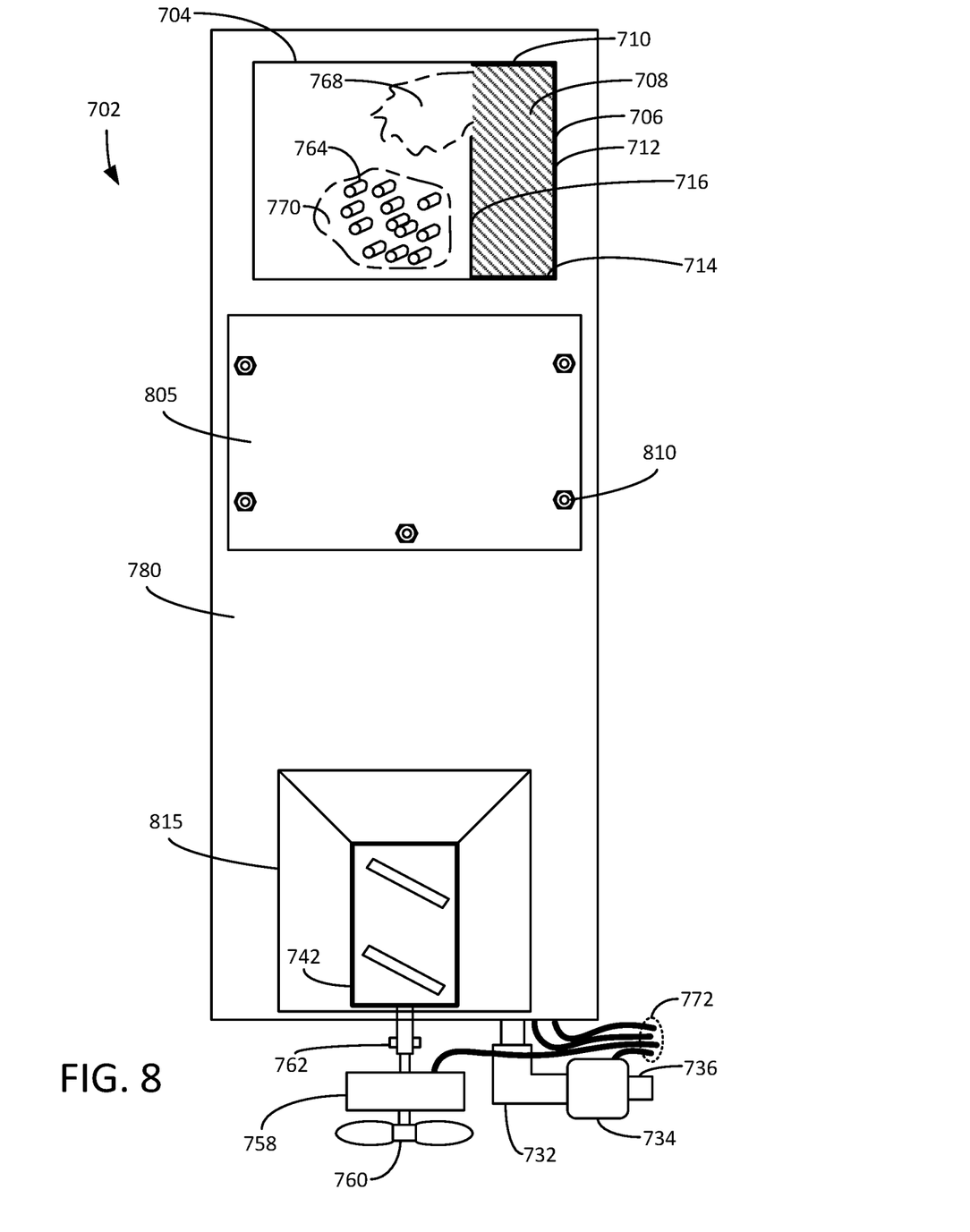
FIG. 8 is a closed plan view of the dual-fuel gas-pellet burner assembly of FIG. 7.

FIG. 8 is a closed plan view of the dual-fuel gas-pellet burner assembly 702 of FIG. 7. The dual-fuel gas-pellet burner assembly 702 can include a removable access cover plate 805 atop the combustion air channeling section 780. Some of the reference numerals and associated components are described above, and therefore, a detailed description of such components is not necessarily repeated.

The removable access cover plate 805 can be secured to the dual-fuel gas-pellet burner assembly 702 using bolts 810 or other suitable securing means such as screws, clips, tabs, or the like. The removable access cover plate 805 can cover and provide access to the cooking gas igniter (e.g., 718 of FIG. 7), the igniter wire (e.g., 722 of FIG. 7), a section of the cooking gas line (e.g., 730 of FIG. 7) adjacent the dual-fuel sectioned combustion chamber 704, and/or a section of the motor-driven pellet auger (e.g., 740 of FIG. 7) adjacent the dual-fuel sectioned combustion chamber 704. A fuel pellet hopper 815 can be disposed above the opening 742 in the upper end section of the auger housing (e.g., 738 of FIG. 7). The wood fuel pellets 764 can be inserted into the hopper 815, which can gradually feed the wood fuel pellets 764 to the motor-driven pellet auger (e.g., 740 of FIG. 7).

Figure 9:
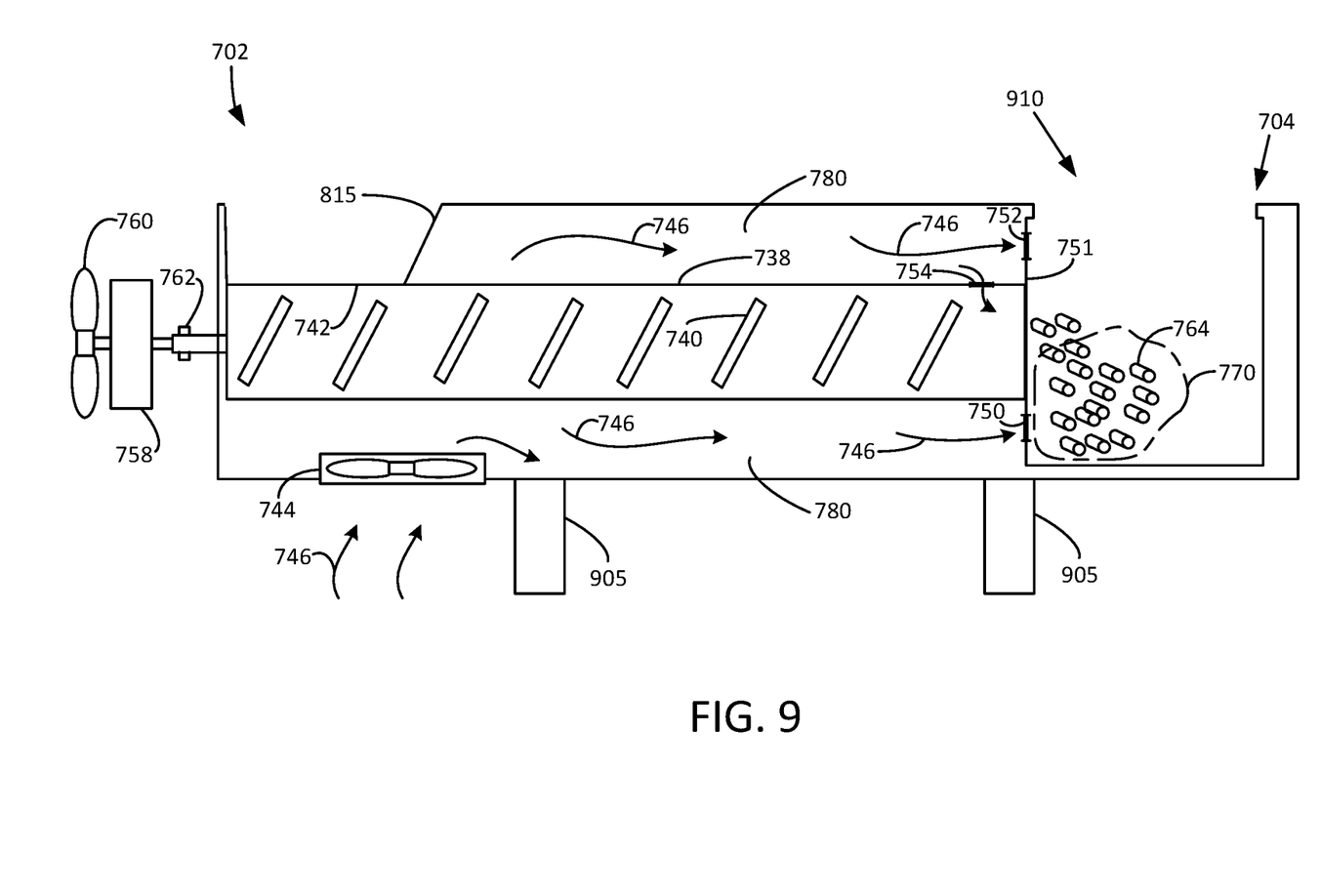
FIG. 9 is a cross sectional side view of the dual-fuel gas-pellet burner assembly of FIG. 7 taken along lines IV-IV.

FIG. 9 is a cross sectional side view of the dual-fuel gas-pellet burner assembly 702 of FIG. 7 taken along lines IV-IV. Some of the reference numerals and associated components are described above, and therefore, a detailed description of such components is not necessarily repeated. The combustion air port 752 can be disposed in the wall 751 that is adjacent to and above the auger housing 738. The combustion air port 750 can be disposed in the wall 751 that is adjacent to the auger housing 738, but not necessarily beneath the auger housing 738. In other words, the combustion air port 750 can be disposed in the wall 751 offset from the auger housing 738 as shown in FIG. 7.

As can be seen in FIG. 9, the fire pot section 704 can include a large opening 910 at the top thereof. The gaseous combustion 770 can provide heat for cooking, or other recreational activities such as barbecuing, enhancing the ambience of an area, spreading pleasant wood burning smells, or the like. The dual-fuel gas-pellet burner assembly 702 can include one or more stands 905 or other support structures to keep the burner assembly higher than a ground level. The combustion air fan 744 can force external air 746 into the combustion air channeling section 780. The wood fuel pellets 764 can be inserted into the hopper 815, which can gradually feed the wood fuel pellets 764 to the motor-driven pellet auger 740.

Figure 10:
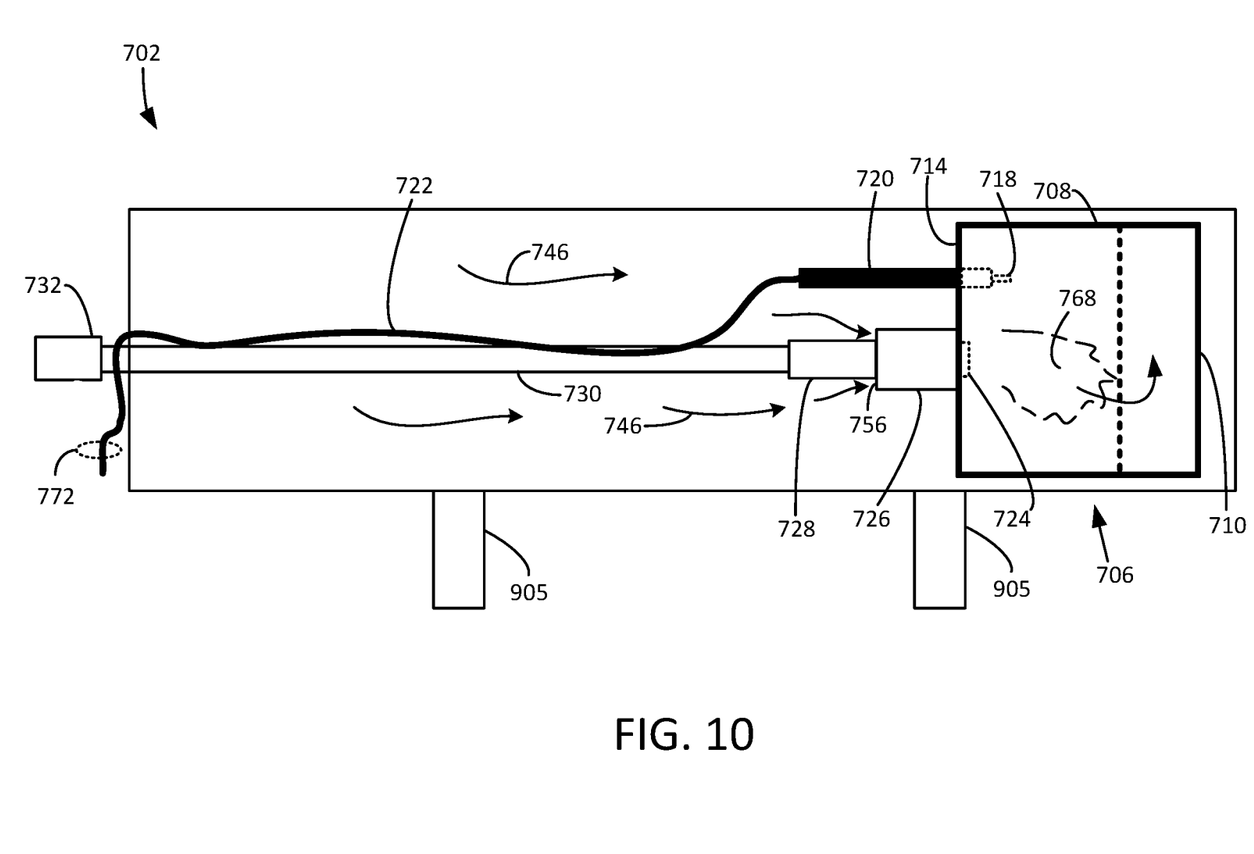
FIG. 10 is another cross sectional side view of the dual-fuel gas-pellet burner assembly of FIG. 7 taken along lines V-V.

FIG. 10 is another cross sectional side view of the dual-fuel gas-pellet burner assembly 702 of FIG. 7 taken along lines V-V. Some of the reference numerals and associated components are described above, and therefore, a detailed description of such components is not necessarily repeated.

The gas flame sensor 720 and cooking gas igniter 718 can be generally disposed within the dual-fuel gas-pellet burner assembly 702 at a higher point relative to the cooking gas line 730, the gas orifice section 728, and the cooking gas line holder 726.

The gas combustion section 706 can receive and mix the air 746 with cooking gas in the gas combustion section 706 of the dual-fuel sectioned combustion chamber 704. The cooking gas igniter 718 can ignite the mixture 768 of the air and the cooking gas in the gas combustion section 706 of the dual-fuel sectioned combustion chamber 704. The mixture 768 of the air and the cooking gas can then escape the gas combustion section 706 into the fire pot section (e.g., 707 of FIG. 7) of the dual-fuel sectioned combustion chamber (e.g., 704 of FIG. 7) to combust the wood fuel pellets (e.g., 764 of FIG. 7). In this manner, the igniter 718 can remain effective for the lifetime of the dual-fuel gas-pellet burner assembly 702 because it does not come into direct contact with the wood fuel pellets (e.g., 764 of FIG. 7).

Figure 11:
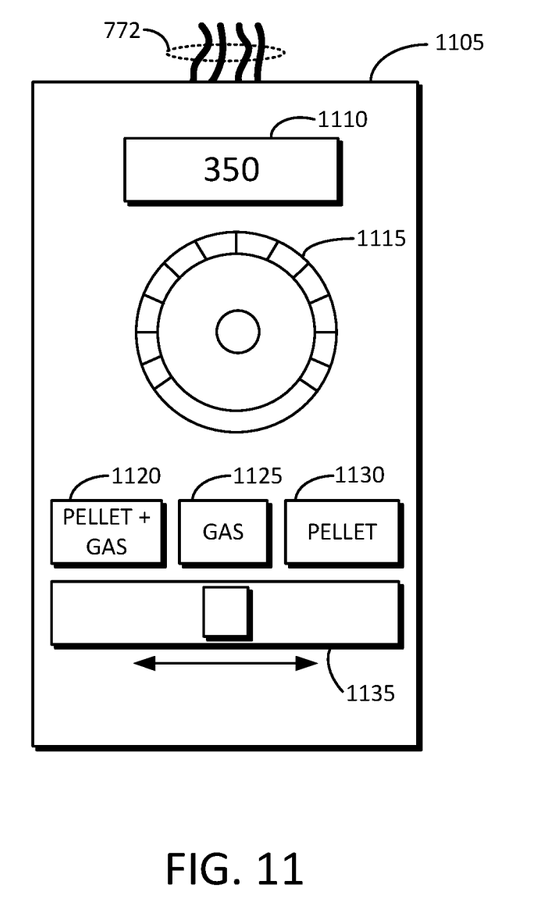
FIG. 11 illustrates a triple mode control unit of the dual-fuel gas-pellet burner assembly of FIG. 7.

FIG. 11 illustrates a triple mode control unit 1105 of the dual-fuel gas-pellet burner assembly 702 of FIG. 7. The triple mode control unit 1105 can include a digital temperature display 1110, a temperature dial 1115, and a switch 1135 configured to receive a user selection among three different modes of operation. The switch 1135 can be a rocker switch, a digital switch, or other suitable switch capable of selecting between three different modes of operation. The bundled wires (e.g., 772 of FIG. 7) can be coupled to the control unit 1105. For example, the igniter wire 772 and one or more of the control wires 782, 784, and 786 (all of FIG. 7) can be coupled to the control unit 1105.

The switch 1135 can receive a first user selection for a pellet plus gas mode 1120 of operation in which the cooking gas line (e.g., 730 of FIG. 7) releases the cooking gas for combustion while the motor-driven pellet auger (e.g., 740 of FIG. 7) delivers the fuel pellets (e.g., 764 of FIG. 7) to the fire pot section (e.g., 707 of FIG. 7) to combust the fuel pellets. The switch 1135 can receive a second user selection for a gas only mode 1125 of operation in which only the cooking gas line (e.g., 730 of FIG. 7) releases the cooking gas for combustion, while the motor-driven pellet auger (e.g., 740 of FIG. 7) is disabled or otherwise turned off. The switch 1135 can receive a third user selection for a pellet only mode 1130 of operation in which only the motor-driven pellet auger (e.g., 740 of FIG. 7) delivers the fuel pellets (e.g., 764 of FIG. 7) to the fire pot section (e.g., 707 of FIG. 7) to combust the fuel pellets.

In the pellet plus gas mode 1120 of operation, the cooking gas line (e.g., 730 of FIG. 7) and the motor-driven pellet auger (e.g., 740 of FIG. 7) can be turned off by the control unit 1105 when a predefined temperature threshold (e.g., 350 degrees as shown on the display 1110) is met or exceeded. In the gas only mode 1125 of operation, the cooking gas line (e.g., 730 of FIG. 7) can be turned off by the control unit 1105 when the predefined temperature threshold (e.g., 1110) is met or exceeded. In the pellet only mode 1130 of operation, the motor-driven pellet auger (e.g., 740 of FIG. 7) can be turned off when the predefined temperature threshold (e.g., 1110) is met or exceeded. The temperature dial 1115 can receive the predefined temperature threshold (e.g., 1110) from a user.

In the pellet plus gas mode 1120 of operation, the cooking gas line (e.g., 730 of FIG. 7) and the motor-driven pellet auger (e.g., 740 of FIG. 7) can be turned on when an operating temperature in the fire pot section (e.g., 707 of FIG. 7) is less than the predefined temperature threshold. In the gas only mode 1125 of operation, the cooking gas line (e.g., 730 of FIG. 7) can be turned on when the operating temperature in the fire pot section (e.g., 707 of FIG. 7) is less than the predefined temperature threshold. In the pellet only mode 1130 of operation, the motor-driven pellet auger (e.g., 740 of FIG. 7) can be turned on when the operating temperature in the fire pot section (e.g., 707 of FIG. 7) is less than the predefined temperature threshold.

Embodiments of the inventive concept include a method for operating a dual-fuel gas-pellet barbecue burner assembly. The method can include partitioning off a gas combustion section of a dual-fuel sectioned combustion chamber from a fire pot section of the dual-fuel sectioned combustion chamber by an internal separator wall. The method can include connecting the gas combustion section of the dual-fuel sectioned combustion chamber to the fire pot section of the dual-fuel sectioned combustion chamber via an opening in the internal separator wall. The method can include delivering, by a motor-driven pellet auger, fuel pellets to the fire pot section of the dual-fuel sectioned combustion chamber. The method can include igniting, by a cooking gas igniter disposed in the gas combustion section of the dual-fuel sectioned combustion chamber, cooking gas received from a cooking gas line within the gas combustion section that is partitioned off from the fire pot section. The method can include permitting, by the opening in the internal separator wall, the ignited cooking gas to enter the fire pot section of the of the dual-fuel sectioned combustion chamber. The method can include combusting the fuel pellets by the ignited cooking gas.

In some embodiments, the method can include receiving, by a switch of a control unit, a first user selection for a pellet plus gas mode of operation in which the cooking gas line releases the cooking gas for combustion while the motor-driven pellet auger is delivering the fuel pellets to the fire pot section to combust the fuel pellets. In some embodiments, the method can include receiving, by the switch of the control unit, a second user selection for a gas only mode of operation in which only the cooking gas line releases the cooking gas for combustion, and the motor-driven pellet auger does not deliver the fuel pellets to the fire pot section. In some embodiments, the method can include receiving, by the switch of the control unit, a third user selection for a pellet only mode of operation in which only the motor-driven pellet auger delivers the fuel pellets to the fire pot section to combust the fuel pellets, and the cooking gas line does not release the cooking gas.

In some embodiments, the method can include receiving a predefined temperature threshold from a user. In the pellet plus gas mode of operation, the method can include turning off the cooking gas line and the motor-driven pellet auger when the predefined temperature threshold is met or exceeded. In the gas only mode of operation, the method can include turning off the cooking gas line when the predefined temperature threshold is met or exceeded. In the pellet only mode of operation, the method can include turning off the motor-driven pellet auger when the predefined temperature threshold is met or exceeded.

In the pellet plus gas mode of operation, the method can include turning on the cooking gas line and the motor-driven pellet auger when an operating temperature in the fire pot section is less than the predefined temperature threshold. In the gas only mode of operation, the method can include turning on the cooking gas line when the operating temperature in the fire pot section is less than the predefined temperature threshold. In the pellet only mode of operation, the method can include turning on the motor-driven pellet auger when the operating temperature in the fire pot section is less than the predefined temperature threshold.

In some embodiments, the method can include channeling air through a combustion air channeling section into the fire pot section of the dual-fuel sectioned combustion chamber via one or more combustion air ports in a wall of the fire pot section. In some embodiments, the fuel pellets are wood fuel pellets. The method can include forcing, by a combustion air fan coupled to a bottom wall of the combustion air channeling section, external air into the air channeling section, and into both of the gas combustion section and the fire pot section of the dual-fuel sectioned combustion chamber. The method can include receiving and mixing, in the gas combustion section of the dual-fuel sectioned combustion chamber, the air with cooking gas. The method can include igniting, by the cooking gas igniter, the mixture of the air and the cooking gas in the gas combustion section of the dual-fuel sectioned combustion chamber. The method can include combining, by the fire pot section of the dual-fuel sectioned combustion chamber, the ignited mixture of the air and the cooking gas with the wood fuel pellets. The method can include combusting, by the ignited mixture of the air and the cooking gas, the wood fuel pellets.

One of skill in the art will recognize that the concepts taught herein can be tailored to a particular application in many other ways. In particular, those skilled in the art will recognize that the illustrated examples are but one of many alternative implementations that will become apparent upon reading this disclosure. Having described and illustrated the principles of the inventive concept with reference to illustrated embodiments, it will be recognized that the illustrated embodiments can be modified in arrangement and detail without departing from such principles, and can be combined in any desired manner And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the inventive concept to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

The invention claimed is:

1. A dual-fuel gas-pellet burner assembly, comprising:
   a cooking gas line;
   a cooking gas igniter;
   a motor-driven pellet auger;
   a combustion air channeling section enclosing the motor-driven pellet auger and at least a section of the cooking gas line; and
   a dual-fuel sectioned combustion chamber including a gas combustion section and a fire pot section,
   wherein:
   the gas combustion section includes a terminal end of the cooking gas line and the cooking gas igniter disposed therein, and the fire pot section includes a terminal end of the motor-driven pellet auger disposed therein;
   the gas combustion section of the dual-fuel sectioned combustion chamber is partitioned off from the fire pot section by an internal separator wall;
   an opening in the internal separator wall connects the gas combustion section of the dual- fuel sectioned combustion chamber to the fire pot section of the dual-fuel sectioned combustion chamber;
   the motor-driven pellet auger is configured to deliver fuel pellets to the fire pot section of the dual-fuel sectioned combustion chamber;
   the cooking gas igniter disposed in the gas combustion section of the dual-fuel sectioned combustion chamber is an electric igniter that is configured to ignite cooking gas received from the cooking gas line within the gas combustion section that is partitioned off from the fire pot section; and
   the opening in the internal separator wall is configured to permit the ignited cooking gas to enter the fire pot section of the dual-fuel sectioned combustion chamber to combust the fuel pellets.

2. The dual-fuel gas-pellet burner assembly of claim 1, further comprising:
   a control unit including a digital temperature display, a temperature dial, and a singular three-way switch configured to receive a user selection among three different modes of operation.

3. The dual-fuel gas-pellet burner assembly of claim 2, further comprising:
   a gas flame sensor coupled to the cooking gas igniter;
   an igniter wire coupled to the gas flame sensor;
   an auger motor coupled to the motor-driven pellet auger;
   a first control wire coupled to the auger motor;
   a combustion air fan coupled to a wall of the combustion air channeling section;
   a second control wire coupled to the combustion air fan;
   a gas solenoid coupled to the cooking gas line; and
   a third control wire coupled to the gas solenoid,
   wherein the igniter wire, the first control wire, the second control wire, and the third control wire are coupled to the control unit.

4. The dual-fuel gas-pellet burner assembly of claim 2, wherein:
   the singular three-way switch is configured to receive a first user selection for a pellet plus gas mode of operation in which the cooking gas line is configured to release the cooking gas for combustion while the motor-driven pellet auger is configured to deliver the fuel pellets to the fire pot section to combust the fuel pellets;
   the switch is configured to receive a second user selection for a gas only mode of operation in which only the cooking gas line is configured to release the cooking gas for combustion; and
   the switch is configured to receive a third user selection for a pellet only mode of operation in which only the motor-driven pellet auger is configured to deliver the fuel pellets to the fire pot section to combust the fuel pellets.

5. The dual-fuel gas-pellet burner assembly of claim 4, wherein:
   in the pellet plus gas mode of operation, the cooking gas line and the motor-driven pellet auger are configured to turn off when a predefined temperature threshold is met or exceeded;
   in the gas only mode of operation, the cooking gas line is configured to turn off when the predefined temperature threshold is met or exceeded;

in the pellet only mode of operation, the motor-driven pellet auger is configured to turn off when the predefined temperature threshold is met or exceeded; and
the temperature dial is configured to receive the predefined temperature threshold from a user.

6. The dual-fuel gas-pellet burner assembly of claim 4, wherein:
in the pellet plus gas mode of operation, the cooking gas line and the motor-driven pellet auger are configured to turn on when an operating temperature in the fire pot section is less than the predefined temperature threshold;
in the gas only mode of operation, the cooking gas line is configured to turn on when the operating temperature in the fire pot section is less than the predefined temperature threshold; and
in the pellet only mode of operation, the motor-driven pellet auger is configured to turn on when the operating temperature in the fire pot section is less than the predefined temperature threshold.

7. The dual-fuel gas-pellet burner assembly of claim 1, wherein the fire pot section of the dual-fuel sectioned combustion chamber includes one or more combustion air ports through which air that is channeled by the air channeling section enters the fire pot section.

8. The dual-fuel gas-pellet burner assembly of claim 7, further comprising an auger housing enclosing the motor-driven pellet auger, wherein the auger housing includes an open end within the fire pot section of the dual-fuel sectioned combustion chamber, and wherein the auger housing includes one or more air ports through which air that is channeled by the air channeling section enters the auger housing and into the fire pot section of the dual-fuel sectioned combustion chamber.

9. The dual-fuel gas-pellet burner assembly of claim 7, wherein the air ports are disposed in a wall of the fire pot section that is vertically oriented at a right angle to a bottom wall of the combustion air channeling section.

10. The dual-fuel gas-pellet burner assembly of claim 1, further comprising:
a cooking gas line holder embedded in an external wall of the dual-fuel sectioned combustion chamber and holding the cooking gas line; and
an air inlet within the cooking gas line holder, wherein the air inlet is disposed between the cooking gas line and the cooking gas line holder, through which air that is channeled by the air channeling section enters the gas combustion section of the dual-fuel sectioned combustion chamber.

11. The dual-fuel gas-pellet burner assembly of claim 10, further comprising a gas line port and a gas solenoid, wherein:
the cooking gas line includes a gas pipe and a gas orifice section;
the cooking gas line holder is configured to receive the gas orifice section;
the gas pipe extends in a straight line from the gas orifice section along the combustion air channeling section and through the gas line port; and
the gas pipe is coupled to the gas solenoid.

12. The dual-fuel gas-pellet burner assembly of claim 1, further comprising a horizontally oriented combustion air fan coupled to a bottom wall of the combustion air channeling section, wherein:
the horizontally oriented combustion air fan is configured to force external air upward through the bottom wall into the air channeling section, and into both of the gas combustion section and the fire pot section of the dual-fuel sectioned combustion chamber;
the gas combustion section of the dual-fuel sectioned combustion chamber is configured to receive and mix the air with cooking gas in the gas combustion section of the dual-fuel sectioned combustion chamber;
the cooking gas igniter is configured to ignite the mixture of the air and the cooking gas in the gas combustion section of the dual-fuel sectioned combustion chamber;
the fire pot section of the dual-fuel sectioned combustion chamber is configured to combine the ignited mixture of the air and the cooking gas with wood fuel pellets; and
the ignited mixture of the air and the cooking gas is configured to combust the wood fuel pellets.

13. The dual-fuel gas-pellet burner assembly of claim 1, further comprising a removable access cover plate atop the combustion air channeling section covering and providing access to:
the cooking gas igniter;
an igniter wire;
a section of the cooking gas line adjacent the dual-fuel sectioned combustion chamber; and
a section of the motor-driven pellet auger adjacent the dual-fuel sectioned combustion chamber.

14. The dual-fuel gas-pellet burner assembly of claim 1, wherein the opening in the internal separator wall extends from a bottom wall of the gas combustion section to a top wall of the gas combustion section.

15. The dual-fuel gas-pellet burner assembly of claim 14, wherein the opening in the internal separator wall extends from a bottom wall of the fire pot section to a top wall of the fire pot section.

16. A method for operating a dual-fuel gas-pellet burner assembly, the method comprising:
partitioning off a gas combustion section of a dual-fuel sectioned combustion chamber from a fire pot section of the dual-fuel sectioned combustion chamber by an internal separator wall;
connecting the gas combustion section of the dual-fuel sectioned combustion chamber to the fire pot section of the dual-fuel sectioned combustion chamber via an opening in the internal separator wall;
delivering, by a motor-driven pellet auger, fuel pellets to the fire pot section of the dual-fuel sectioned combustion chamber;
igniting, by a cooking gas igniter disposed in the gas combustion section of the dual-fuel sectioned combustion chamber, cooking gas received from a cooking gas line within the gas combustion section that is partitioned off from the fire pot section;
permitting, by the opening in the internal separator wall, the ignited cooking gas to enter the fire pot section of the dual-fuel sectioned combustion chamber;
combusting the fuel pellets by the ignited cooking gas;
channeling air through a combustion air channeling section into the fire pot section of the dual-fuel sectioned combustion chamber via one or more combustion air ports in a wall of the fire pot section;
wherein the fuel pellets are wood fuel pellets, the method further comprising:
forcing, by a combustion air fan coupled to a bottom wall of the combustion air channeling section, external air into the air channeling section, and into both of the gas combustion section and the fire pot section of the dual-fuel sectioned combustion chamber;

receiving and mixing, in the gas combustion section of the dual-fuel sectioned combustion chamber, the air with cooking gas;

igniting, by the cooking gas igniter, the mixture of the air and the cooking gas in the gas combustion section of the dual-fuel sectioned combustion chamber;

combining, by the fire pot section of the dual-fuel sectioned combustion chamber, the ignited mixture of the air and the cooking gas with the wood fuel pellets; and combusting, by the ignited mixture of the air and the cooking gas, the wood fuel pellets.

17. The method of claim 16, further comprising:

receiving, by a singular three-way switch of a control unit, a first user selection for a pellet plus gas mode of operation in which the cooking gas line releases the cooking gas for combustion while the motor-driven pellet auger is delivering the fuel pellets to the fire pot section to combust the fuel pellets;

receiving, by the switch of the control unit, a second user selection for a gas only mode of operation in which only the cooking gas line releases the cooking gas for combustion, and the motor-driven pellet auger does not deliver the fuel pellets to the fire pot section; and receiving, by the switch of the control unit, a third user selection for a pellet only mode of operation in which only the motor-driven pellet auger delivers the fuel pellets to the fire pot section to combust the fuel pellets, and the cooking gas line does not release the cooking gas.

18. The method of claim 17, further comprising:

receiving a predefined temperature threshold from a user;

in the pellet plus gas mode of operation, turning off the cooking gas line and the motor- driven pellet auger when the predefined temperature threshold is met or exceeded;

in the gas only mode of operation, turning off the cooking gas line when the predefined temperature threshold is met or exceeded; and in the pellet only mode of operation, turning off the motor-driven pellet auger when the predefined temperature threshold is met or exceeded.

19. The method of claim 18, further comprising:

in the pellet plus gas mode of operation, turning on the cooking gas line and the motor-driven pellet auger when an operating temperature in the fire pot section is less than the predefined temperature threshold;

in the gas only mode of operation, turning on the cooking gas line when the operating temperature in the fire pot section is less than the predefined temperature threshold; and in the pellet only mode of operation, turning on the motor-driven pellet auger when the operating temperature in the fire pot section is less than the predefined temperature threshold.

* * * * *